March 12, 1957 W. P. DREWS ET AL 2,784,826
PRETREATMENT OF REGENERATED CATALYST IN THE
HYDROFORMING OF A NAPHTHA FRACTION
Filed Dec. 26, 1951
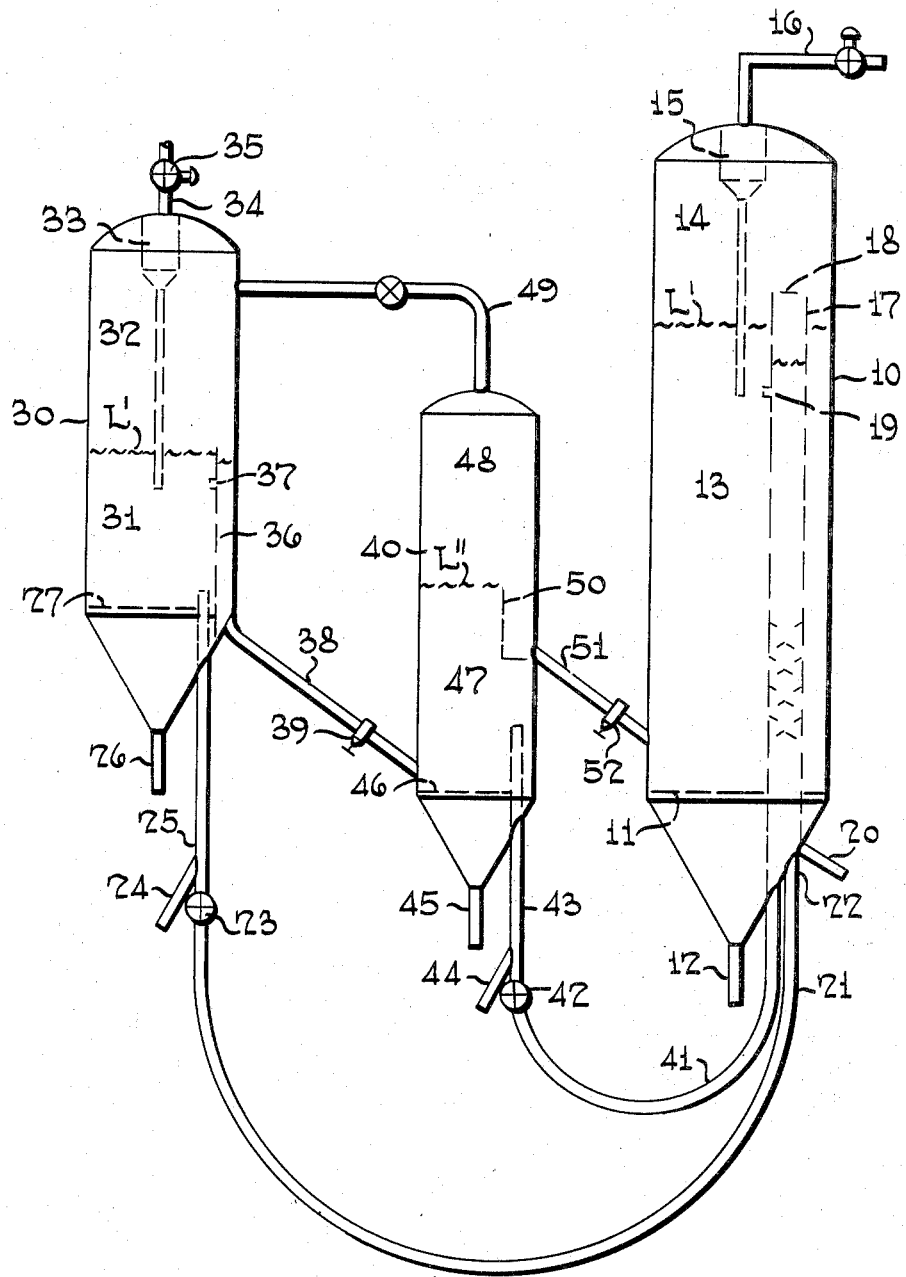
William P. Drews
Arnold F. Kaulakis
Warren K. Lewis Jr. Inventors
By J. Cushman Attorney United States Patent Office 2,784,826
Patented Mar. 12, 1957

2,784,826

PRETREATMENT OF REGENERATED CATALYST IN THE HYDROFORMING OF A NAPHTHA FRACTION

William P. Drews, Elizabeth, Arnold F. Kaulakis, Chatham, and Warren K. Lewis, Jr., Elizabeth, N. J., assignors to Esso Research and Engineering Company, a corporation of Delaware Application December 26, 1951, Serial No. 263,449

4 Claims. (Cl. 196—50)

The present invention relates to the catalytic conversion of hydrocarbons and particularly to the reforming of hydrocarbon fractions boiling within the motor fuel range of low knock rating into high octane number fuels rich in aromatics by contacting these fractions under reforming conditions with solid catalyst particles in a fluidized solids reactor system.

It is well known that hydrocarbon fractions can be subjected to reforming operations to yield products rich in aromatics or liquid products boiling within the motor fuel range and possessing improved octane numbers and excellent engine cleanliness characteristics. Reforming operations employing catalysts, especially hydroforming and aromatization processes are widely used in the petroleum industry. By hydroforming is ordinarily meant a process wherein hydrocarbon fractions boiling within the motor fuel or naphtha range are treated at elevated temperatures and pressures in the presence of certain solid catalysts and hydrogen whereby the hydrocarbon fraction is increased in aromaticity with no net consumption of hydrogen. The term "aromatization" when used broadly refers to conversions which increase the aromaticity of the hydrocarbon fraction treated. As generally used in the petroleum industry, aromatization is a process in which hydrocarbon fractions are treated at elevated temperatures in the presence of solid catalysts and in the presence or absence of added hydrogen, usually at pressures somewhat lower than those employed in hydroforming whereby the aromaticity of the hydrocarbon fraction is increased.

Catalytic reforming processes are usually carried out at temperatures of about 750°–1150° F. in the pressure range of about 0–3000 lbs. per sq. inch and in the presence of such catalysts as molybdenum oxide, chromium oxide, tungsten oxide and in general oxides and sulfides of metals of groups IV, V, VI, VII and VIII of the Periodic System of elements. These catalytic materials are usually dispersed or supported on a base or spacing agent. A commonly used spacing agent for this type of catalyst is alumina either precipitated or of the gel type. Catalysts which are more heat stable or better able to withstand the high regeneraiton temperatures of 1000°–1200° F. encountered in these processes have been prepared upon zinc aluminate spinel supports.

It has been proposed in application Serial No. 188,236 filed October 3, 1950, now Patent No. 2,689,823 to effect the hydroforming of naphtha fractions in a fluidized solids reactor system in which naphtha vapors are passed continuously through a dense, fluidized bed of reforming catalyst particles in a reaction zone, spent catalyst particles being withdrawn from the dense bed in the reaction zone and transferred to a separate regeneration zone where inactivating carbonaceous deposits are removed by combustion whereupon the regenerated catalyst particles are recycled or returned to the main reactor vessel. Fluid reforming as thus conducted has several fundamental advantages over fixed bed reforming such as (1) the operations are continuous, (2) the vessels and equipment can be designed for single rather than dual functions, (3) the reactor temperature is substantially constant throughout the reactor bed and (4) the regeneration or reconditioning of the catalyst may be readily controlled.

A particular advantage of the foregoing fluid solids operation has been the fact that the freshly regenerated catalyst can be utilized to carry part of the necessary heat requirements for the reforming reaction from the regeneration zone into the reaction zone. It has been proposed in this connection to discharge hot freshly regenerated catalyst particles from the regenerator standpipe into a stream of hot, hydrogen-rich recycle gas in a transfer line whereby the catalyst particles are subjected to a reconditioning treatment involving at least a partial reduction of a higher oxide of the catalytic metal formed during regeneration to a form of lower oxide of the catalytic metal which is more catalytically active during its passage through the transfer line into the reaction zone. In view of the high temperature of the freshly regenerated catalyst (1050°–1200° F.) and the exothermic character of the reaction between the hot, freshly regenerated catalyst and the hydrogen-rich gas, it is necessary to make the transfer line of small diameter and as short as possible in order to keep the time of contact of the regenerated catalyst and hydrogen-containing gas sufficiently short to avoid overtreatment and/or thermal degradation of the catalyst.

It is the object of this invention to provide a novel method of treating freshly regenerated reforming catalyst preparatory to recycling the same to a fluidized solids reforming reactor.

It is also the object of this invention to provide a novel method whereby freshly regenerated reforming catalysts may be treated with hydrogen-containing gas without undergoing thermal degradation through excessive temperature increases.

These and other objects will appear more clearly from the detailed specification and claims which follow.

It has now been found that freshly regenerated reforming catalyst can be treated with hydrogen-containing gas without danger of thermal degradation if a stream of reactor or spent catalyst is supplied to the regenerated catalyst treating vessel in an amount sufficient to absorb the heat of reduction and thereby control the temperature of the catalyst undergoing reduction. In the absence of such cooling, a temperature rise of approximately 120° F. would be encountered which would cause a substantial deterioration in the activity and/or selectivity of the catalyst. Since the mixture of reactor catalyst and hydrogen-treated regenerated catalyst is thereupon recycled to the reactor, the sensible heat of the regenerated catalyst as well as the heat of reduction is transferred to the reaction zone thereby reducing the amount of heat that must be supplied to the reaction zone by preheating the feed stock and recycle gas charged to the reaction zone.

Reference is made to the accompanying drawing illustrating one embodiment of the present invention.

In the drawing, 10 is a reactor vessel which may desirably be a vertical cylindrical vessel of considerable length or height. A perforated plate or distributor grid 11 is preferably arranged in the lower part of reactor 10 in order to insure uniform distribution of the incoming reactants over the entire cross-section of the reactor. An inlet line 12 for the introduction of preheated or vaporized feed stock and preheated recycle gas is connected to the bottom of the reactor vessel 10. Since the hydrocarbon feed stock and the recycle gas are preheated separately and to different temperatures, separate inlet lines for these materials can be provided and, if desired, the hydrocarbon feed can be introduced above the grid member 11 in which case a distributor ring or the like would be provided in order to insure uniform distribution of the incoming feed. The reactor is charged with a reforming catalyst such as molybdenum oxide or chromium oxide on a support such as alumina or zinc aluminate spinel. The catalyst being in finely divided form is maintained as a dense, fluidized, turbulent bed 13 by the passage of hydrogen-rich gas and vaporized hydrocarbon feed stock therethrough. The dense bed 13 has a definite level L and is superposed by a dilute or disperse phase 14 comprising gaseous or vaporous reaction products containing a small amount of catalyst entrained therein. The reaction products are taken overhead from the reactor vessel 10, preferably after passage through a cyclone separator 15 which serves to knock out entrained catalyst which is thereupon returned to the dense bed 13 through the dip pipe attached to the bottom of the cyclone separator 15. The reaction products pass overhead through outlet line 16 to suitable fractionating, stabilizing and/or storage equipment.

Means are provided for the withdrawal of a stream of catalyst directly from the dense bed 13. This may be in the form of a cell or conduit 17 arranged within the reactor with its upper end 18 extending above the dense bed level L. One or more ports or restricted passageways 19 are provided in the wall of conduit 17 below the level L of the dense bed for the discharge of catalyst directly from dense bed 13 into conduit 17. The conduit 17 could also be arranged externally of the reactor vessel 10 in which event suitable connector pipes would be provided to conduct a stream of catalyst from the dense bed 13 into the conduit and to conduct stripping gas from the top of the conduit into the dilute phase 14 in the upper part of the reactor, or, if desired, directly into outlet line 16. A gas such as steam, methane, nitrogen, or the like is supplied to the lower portion of conduit 17 as at 20 in order to strip out entrained reaction products or vaporizable materials by passing upwardly through conduit 17 countercurrent to descending catalyst particles. Baffles may be arranged in conduit 17 in order to improve the contact of the catalyst and the stripping gas. Steam is the preferred stripping agent because of its ability to remove chemisorbed hydrogen from the spent catalyst thereby minimizing the amount of combustible material carried by the spent catalyst to the regenerator.

A U-bend transfer line 21 is connected to the bottom of the stripping cell or conduit 17 at 22 for withdrawing stripped spent catalyst therefrom and conducting it to the regenerator vessel. A slide valve 23 or the like is provided for controlling the flow of spent catalyst to the regenerator 30. An air inlet line 24 is provided in the spent catalyst riser line 25 to facilitate the passage of spent catalyst through the riser line into the regenerator. In view of the high rate of burning of the carbonaceous deposits on the reforming catalyst it is preferable to use only a part, generally not more than 15 to 40%, of the air required for regeneration as lift gas in riser line 25 and to supply the major part of the air required for regeneration directly to the regenerator through inlet line 26. A perforated plate or distributor grid 27 is preferably arranged in the lower part of the regenerator to insure uniform distribution of the incoming air over the entire cross section of the regenerator vessel. The velocity of the regeneration gases through the vessel 30 is so controlled as to form a dense, fluidized turbulent bed 31 of catalyst particles and gas having a definite level L' superposed by a dilute or disperse phase 32 comprising regeneration gases containing small amounts of catalyst entrained therein. The regeneration gases are taken overhead from the regenerator 30 through a cyclone separator 33 or the like which removes entrained catalyst particles from the outgoing gases and returns the separated catalyst to the dense bed 31 through the dip leg attached to the bottom of the separator. The regeneration gases are then passed via outlet line 34 through a pressure reducing or release valve 35 and thence to a waste gas stack or to suitable scrubbing and storage means if it is desired to utilize this gas as stripping gas in the system. In view of the fact that the oxidative reactions that occur in the regenerator generate more heat than can normally be transferred to the reactor by the circulating catalyst at low catalyst to oil ratios without exceeding safe temperature limits, it is ordinarily necessary to provide cooling coils in the regenerator. A very desirable arrangement is to provide a primary cooling coil entirely below the level L' and a secondary cooling coil partly below and partly above the dense bed level L' to permit adjustment of the heat transfer capacity by simply varying the dense bed level L' in the regenerator.

Regenerated catalyst is discharged from the dense bed 31 into a withdrawal well 36 through a submerged orifice or restricted passageway 37. The regenerated catalyst is discharged from the withdrawal well 36 through standpipe 38 and slide valve 39 into reducer or pretreater 40. A stream of reactor catalyst is also discharged into pretreater 40 in order to control the temperature therein. This stream of reactor catalyst is withdrawn from the bottom of the stripper cell or conduit 17 and conducted through U-bend transfer line 41 into pretreater 40. A slide valve 42 is provided in recycle reactor catalyst riser line 43 to control the flow of reactor catalyst into pretreater 40. An inlet line 44 is provided in the lower part of recycle reactor catalyst riser line 43 for the introduction of a stream of hydrogen-containing or other suitable lift gas to facilitate the passage of reactor catalyst into the pretreater 40. Hydrogen-containing gas such as recycle process gas or preferably high pressure make gas or excess process gas that would normally be withdrawn from the reactor system is supplied to pretreater 40 through inlet line 45. A perforated plate or grid 46 is preferably provided in the bottom of the pretreater 40 to insure uniform distribution of the incoming hydrogen-containing gas over the entire cross section of the pretreater. The velocity of the hydrogen-containing gas is controlled to form a dense, fluidized, turbulent bed 47 comprising a mixture of regenerated and recycle reactor catalyst in said hydrogen-containing gas. The dense bed 47 has a level L'' and is superposed by a dilute or disperse phase 48. The gaseous pretreatment products are taken overhead through outlet line 49 and are discharged into the dilute phase 32 in the upper part of the regenerator 30. In this way, catalyst particles entrained in the pretreatment gases are separated in the regenerator cyclones 33 and retained in the system.

The pretreated catalyst mixture overflows from dense bed 47 into catalyst withdrawal well 50 from where it flows through standpipe 51 and slide valve 52 into the dense bed 13 in reactor vessel 10.

It is not intended that the invention be limited to the particular embodiment shown in the drawings. For example, while U-bend transfer systems are shown for transferring stripped catalyst to the regenerator vessel 30 and to the pretreater vessel 40 it would also be possible to use standpipes and dilute phase risers and moreover it would also be possible to use U-bend transfer systems to conduct regenerated catalyst to the reactor. In the embodiment illustrated, the relative elevations of the several vessels, which is determined by the pressure balance, make it simpler to use direct return standpipes for the regenerated catalyst and pretreated catalyst transfer. It should also be noted that in addition to preventing thermal degradation of the catalyst through absorption of the heat of reduction, the reactor system illustrated offers a further advantage in avoiding the necessity of stripping of the regenerated catalyst for example in the withdrawal well 36 or standpipe 38. Since the pretreatment gases are discharged into the regenerator and thence to a waste gas stack or the like, stripping of regeneration gases from the catalyst can be effected with the hydrogen-containing pretreatment gas simultaneously with the pretreatment or reduction of the catalytic metal oxide.

The feed or charging stock to the reforming reactor may be a virgin naphtha, a cracked naphtha, a Fischer-Tropsch naphtha or the like having a boiling range of from about 130°–430° F. or a narrow boiling fraction within this range, for example a fraction having a boiling range of from 130°–185° F. The feed stock is preheated alone or in admixture with hydrogen-rich recycle gas to reaction temperature or to the maximum temperature possible while avoiding thermal degradation of the feed stock. Ordinarily preheating of the feed stock is carried out to temperatures of about 800°–1050° F., preferably about 1000° F. The naphtha preheat can be carried out to high temperatures by limiting the time of residence thereof in the preheat furnace and in the transfer or feed inlet lines. The preheated feed stock may be supplied to the reactor vessel for admixture with preheated hydrogen-rich recycle gas in the inlet line or below the distributor grid or it may be introduced separately through a distributor ring, or the like, arranged above the grid. The recycle gas, which contains from about 50–80 vol. percent hydrogen is preheated to temperatures of about 1150°–1300° F., preferably about 1200° F. prior to the introduction thereof into the inlet line. The recycle gas should be circulated through the reforming reaction zone at a rate of from about 1000–8000 cu. ft. per barrel of feed. The amount of recycle gas used is preferably the minimum amount that will suffice to introduce the necessary heat of reaction and keep carbon formation at a low level.

The reactor system is charged with a mass of finely divided reforming catalyst particles. Suitable catalysts include group VI metal oxides such as molybdenum oxide, chromium oxide or tungsten oxide, or mixtures thereof, upon a carrier such as activated alumina, zinc aluminate spinel or the like. Preferred catalysts contain about 5 to 15 wt. percent molybdenum oxide or from about 10 to 40 wt. percent chromium oxide upon a suitable carrier. If desired, minor amounts of stabilizers and promoters such as silica, calcium oxide, ceria or potassia can be included in the catalyst. The catalyst particles are, for the most part, between 200 and 400 mesh in size or about 0–200 microns in diameter with a major proportion between 20 and 80 microns.

The reforming reactor vessel should be operated at temperatures between about 800° F. and 1150° F. and at pressures between about 5 and about 500 lbs. per sq. inch. The particular temperature and pressure used is governed principally by the nature of the feed stock and the nature of the end product desired. For example, a narrow boiling hexane rich fraction is preferably reformed in contact with a chromia-alumina catalyst at temperatures of about 1000°–1025° F. and at pressures of about 10 to 50 lbs. per sq. inch gauge while a 200°–350° F. boiling range naphtha is preferably reformed in contact with a molybdenum oxide-alumina catalyst at temperatures of about 900°–925° F. and at pressures of about 200 lbs. per sq. inch gauge. Lowering reactor pressure ordinarily results in increased carbon formation while increasing reactor pressures results in an increase in catalyst selectivity to light products ($C_4$'s and lighter). The regenerator vessel is normally operated at essentially the same pressure as the reactor vessel to facilitate flow between the several vessels and at temperatures of about 1050°–1200° F. The residence time of the catalyst in the reactor is of the order of from about 0.5 to 5.0 hours and in the regenerator of from about 3 to 15 minutes. Regeneration is conducted with an excess amount of air or with such amounts of air that there will be some free oxygen in the flue gases from the regenerator and the catalytic metal will be converted to a higher oxide during regeneration.

The weight ratio of catalyst to oil introduced into the reactor should be about 1 to 10. Space velocity or the weight in pounds of feed charged per pound of catalyst in the reactor depends upon the age or activity level of the catalyst, the character of the feed stock and the desired octane number of the product. Space velocity for a molybdenum oxide on alumina gel or a chromia-alumina catalyst may vary, for example, from about 1.5 wt./hr./wt. to about 0.15 wt./hr./wt.

The temperature in the regenerator is maintained at between about 1050° and about 1200° F., preferably at the maximum temperature that the catalyst can withstand in order that a maximum amount of heat can be transferred to the reaction zone as sensible heat of the regenerated catalyst. The reduction of the higher catalytic metal oxides formed in the regeneration zone is highly exothermic and results in a substantial temperature rise which may be of the order of about 120° F. The temperature rise is dependent upon the nature of the catalyst, i. e. whether a chromia- or molybdena-containing catalyst, as well as upon the amount of catalytic metal oxide present in the catalyst. Accordingly, it is necessary to supply recycle reactor catalyst to the pretreatment zone 40 at a sufficient rate to absorb this heat of reduction. The ratio of recycle reactor catalyst to regenerated catalyst added to the pretreatment zone will vary somewhat, depending upon the temperature at which the reaction zone is operated or upon the spread or difference between the temperature maintained in the regeneration zone and the reaction zone. The amount of reactor catalyst added should be sufficient to prevent a temperature rise of more than a few degrees, preferably not more than about 10° F. above the regenerator temperature. The residence time of the catalyst in the pretreatment or reducing zone may be from about 0.5 to 180 minutes.

The following example is illustrative of the present invention.

EXAMPLE

Feed: Isomerized normal hexane cut obtained from cyclohexane fractionation plus Baton Rouge $C_6$—180 virgin naphtha.

Catalyst:

| | Parts |
|---|---|
| $Cr_2O_3$ | 29 |
| $Al_2O_3$ | 100 |
| K (as $K_2O$) | 2 |
| Ceria | 86 |

Process conditions:

| | | |
|---|---|---|
| Reactor top pressure | P. s. i. g | 10 |
| Reactor temperature | ° F | 1015 |
| W/hr./W design | | 0.16 |
| C/O ratio | | 10.0 |
| Naphtha preheat | ° F | 1000 |
| Recycle preheat | ° F | 1200 |
| Regenerator temperature | ° F | 1175 |
| Reducer temperature | ° F | 1175 |
| Reducer residence time (Regen. Cat. only) | Sec | 30 |

Yields:

| | | |
|---|---|---|
| Dry Gas, wt. percent | (Percent on feed) | 13.0 |
| $C_4$, vol. percent | do | 4.0 |
| $C_5+$, liquid vol. percent | do | 69.1 |
| Total benzene, vol. percent | do | 42.8 |
| Net benzene, vol. percent | do | 36.8 |
| Coke, wt. percent | do | 5.5 |
| $H_2$ make, C. F./B | | 2150 |

The foregoing description contains a limited number of embodiments of the present invention. It will be understood, however, that numerous modifications may be made by those skilled in this art without departing from the spirit or scope of this invention.

What is claimed is:

1. In a process for reforming hydrocarbons in contact with finely divided hydroforming catalysts comprising a group VI metal oxide upon a support in accordance with the fluidized solids technique at temperatures between about 800° F. and 1150° F., at pressures between about 5 and 500 and at catalyst to oil weight ratios of about 1 to 10, the improvement which comprises continuously withdrawing a stream of catalyst particles from the reaction zone, regenerating the withdrawn catalyst particles by burning carbonaceous deposits therefrom at temperatures of about 1050–1200° F. in a separate regeneration zone, withdrawing a stream of regenerated catalyst particles from the regeneration zone and discharging the withdrawn regenerated catalyst particles substantially at regeneration temperature into a pretreating zone without contact with hydrogen-containing or other reducing gases, withdrawing a second stream of reactor catalyst particles from the reaction zone and discharging said second stream of reactor catalyst at substantially reaction zone temperature into said pretreating zone, supplying hydrogen-containing gas to the bottom of the pretreating zone in order to thoroughly mix the reactor catalyst particles with the regenerated catalyst particles and to reduce the higher catalytic metal oxides in the regenerated catalyst particles into a lower, more catalytically active form of catalytic metal oxide, supplying reactor catalyst particles to said pretreatment zone via said second stream of reactor catalyst in sufficient amount to absorb the heat of reduction of the regenerated catalyst and to prevent the temperature of the catalyst undergoing pretreatment from rising more than 10° F. above the temperature of the catalyst undergoing regeneration, withdrawing the pretreatment gases and the catalyst particles separately from the pretreatment zone and discharging the catalyst particles withdrawn from the pretreatment zone, substantially free from pretreatment gases into the reaction zone.

2. The process as defined in claim 1 wherein the off gases from the pretreatment zone are discharged into the regeneration zone.

3. The process as defined in claim 2 in which the catalyst consists essentially of from 5 to 15% molybdenum oxide upon an alumina-containing support.

4. The process as defined in claim 1 in which the catalyst consists essentially of from 5 to 15% molybdenum oxide upon an alumina-containing support.

References Cited in the file of this patent
UNITED STATES PATENTS

| | | |
|---|---|---|
| 2,366,372 | Voorhees | Jan. 2, 1945 |
| 2,472,844 | Munday et al. | June 14, 1949 |
| 2,547,221 | Layng | Apr. 3, 1951 |